United States Patent [19]
Anamoto

[11] Patent Number: 5,713,334
[45] Date of Patent: Feb. 3, 1998

[54] START UP CONTROL FOR ENGINE

[75] Inventor: Takayuki Anamoto, Iwata, Japan

[73] Assignee: Yamaha Hatsudoki Kabushiki Kaisha, Iwata, Japan

[21] Appl. No.: 685,148

[22] Filed: Jul. 23, 1996

[30] Foreign Application Priority Data

Jul. 24, 1995 [JP] Japan ................... 7-186994

[51] Int. Cl.$^6$ ................................. F02M 51/00
[52] U.S. Cl. .................................... 123/491
[58] Field of Search .............. 23/491, 490, 443, 23/479

[56] References Cited

U.S. PATENT DOCUMENTS

| | | |
|---|---|---|
| 4,418,674 | 12/1983 | Hasegawa et al. ............ 123/491 |
| 4,941,449 | 7/1990 | Hoptner et al. ............... 123/490 |
| 5,249,560 | 10/1993 | Gian et al. ................... 123/443 |
| 5,390,641 | 2/1995 | Yamada et al. ............... 123/491 |
| 5,482,022 | 1/1996 | Aoki et al. ................... 123/479 |
| 5,577,482 | 11/1996 | Nakashima et al. .......... 123/491 |

*Primary Examiner*—Raymond A. Nelli
*Attorney, Agent, or Firm*—Knobbe, Martens, Olson & Bear LLP

[57] ABSTRACT

An improved fuel injection control system for an engine embodying a plurality of fuel injectors, one for each cylinder. During normal engine running conditions, the amount of fuel injected is determined by engine running conditions and the injectors are operated sequentially in accordance with the engine firing order. For facilitating startup, the injectors are all operated simultaneously during the startup mode to supply a predetermined amount of fuel.

18 Claims, 15 Drawing Sheets

* 2 Dimensional Map

START UP CONTROL FOR ENGINE

BACKGROUND OF THE INVENTION

This invention relates to an improved engine control system and method and more particularly to an improved start up control system and method for engines.

A wide variety of engine controls have been employed for internal combustion engines. These controls are frequently employed in conjunction with fuel injection systems. This is desirable because such controls and the associated fuel injection systems offer the possibility of improving engine performance while at the same time permitting efficient exhaust emission control and better fuel economy.

In many of these engine control systems and methods there is provided a separate fuel injector for each combustion chamber or cylinder of the engine. Of course, such systems offer the possibility of even more accurate control. However, these systems also somewhat add to the cost of the overall engine. Furthermore, they require a more complicated control strategy.

The engine control is particularly critical during initial startup phase. One problem with individual cylinder control, particularly during startup is that it is difficult at times to tell which cylinder will be the first cylinder that should be fired even though the firing order is known and memorized in the computer. Furthermore, during startup it is frequently desirable to provide additional fuel to compensate for starting conditions particularly for the lack of fuel in the induction tract and also the possible low temperature of the induction tract.

It is, therefore, a principal object of this invention to provide an improved engine startup control apparatus and method for an engine.

It is a still further object of this invention to provide an improved control system and method for utilization in the starting of fuel injected engines and particularly those having multiple cylinders.

One of the methods and systems which have been proposed for use in engine management to improve engine performance, fuel economy and exhaust emission control employs feedback control. One form of feedback control system employs an air/fuel ratio sensor such as an oxygen ($O_2$) sensor. The oxygen sensor is positioned to receive the exhaust gases from the combustion chamber and measure the amount of oxygen in them. From determining the amount of oxygen in the exhaust gases the actual air/fuel ratio burnt in the cylinder can be determined.

Although oxygen sensor feedback control systems can offer the prospect of very efficient and effective engine control, they are quite costly. In addition, there are some engine conditions wherein the feedback control from a sensor such as an oxygen sensor are not possible. For example, under initial startup and until the oxygen sensor reaches its operating temperature, it cannot be utilized as a control system. Furthermore, there is a wide variety of other engine running conditions wherein the output of the $O_2$ sensor for a variety of reasons cannot be employed for control. Even with feed back control systems the initial setting of the fuel air ratio is based on certain engine measurements and the feed back system makes adjustments in the basic settings based on the output of the $O_2$ sensor.

It is, therefore, a further object of this invention to provide an improved control system for an engine wherein the control system is simple and also provides effective control upon initial engine starting.

SUMMARY OF THE INVENTION

This invention is adapted to be embodied in an engine control system and method for an internal combustion engine having a plurality of combustion chambers that fire in a predetermined sequence. An air induction system for supplies an air charge to the engine. A plurality of fuel injectors are provided, one for each combustion chamber for supplying fuel thereto. An exhaust system discharges the burnt charge from the engine. Means are also provided for starting the engine.

In accordance with an engine operated in accordance with the invention, a control is provided for controlling the operation of the fuel injectors by controlling both their timing of injection and the duration of injection. When the engine is being started up by the starting means, the injectors are all fired simultaneously so as to inject a predetermined amount of fuel from each injector. However, once the engine is running, the injectors are fired in the firing order sequence.

Another feature of the invention is adapted to be embodied in a method for operating an engine as described. In accordance with this method, when the starting means for the engine is operated, the injectors are all fired simultaneously so that each injects a predetermined amount of fuel at the same time. However, when the engine is running, the injectors are fired in their normal firing order sequence.

BRIEF DESCRIPTION OF THE DRAWINGS

FIG. 13 is a view in part schematic showing the control routines to determine which mode the engine is being operated in.

DETAILED DESCRIPTION OF THE PREFERRED EMBODIMENTS OF THE INVENTION

Figure 1:
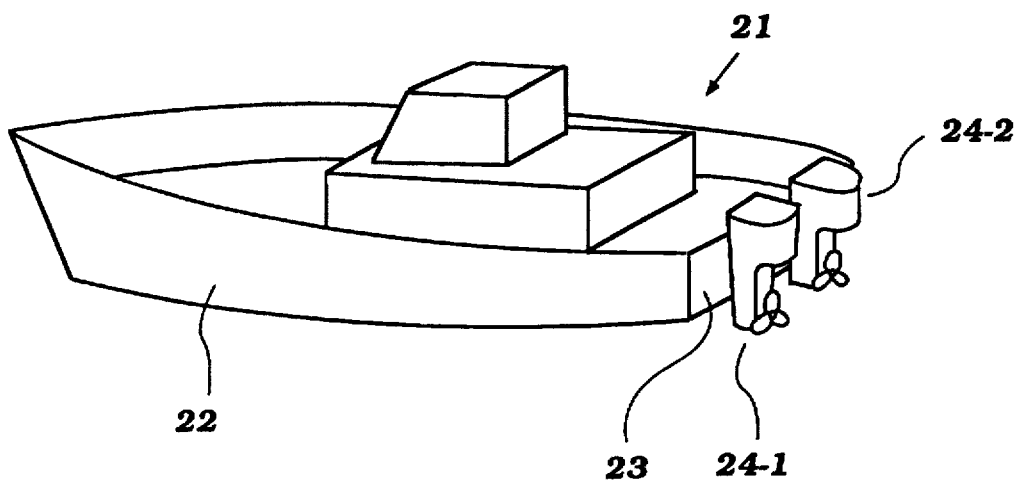
FIG. 1 is a rear, side perspective view of a watercraft powered by a propulsion system constructed and operated in accordance with an embodiment of the invention.

Referring now in detail to the drawings and initially to FIG. 1, a watercraft constructed and propelled by a propulsion system that is operated and constructed in accordance with an embodiment of the invention is identified generally by the reference numeral 21. Although the invention is described in conjunction with a watercraft such as the watercraft 21, it will be readily apparent to those skilled in the art from the following description, as well as from the foregoing remarks, that the invention is directed primarily to the control for the propulsion system of the watercraft 21.

For this reason and since the control system is not limited to any particular engine or engine type or use for the engine, an application to a watercraft, such as the watercraft 21, is utilized only to enable to those skilled in the art to understand how the invention can be utilized. Those skilled in the art will readily understand how the invention can be utilized in conjunction with any of a wide variety of types of internal combustion engines as well as loads operated by those engines.

To continue, the watercraft 21 includes a hull 22 which has a transom 23 upon which a pair of outboard motor propulsion devices 24-1 and 24-2 are mounted. The invention is described in conjunction with an application embodying dual propulsion devices because, as will become apparent, certain facets of the invention have utility in conjunction with arrangements wherein there are such dual propulsion devices. For the foregoing reasons, however, those skilled in the art will readily understand how the invention can be employed with engine applications utilizing only one engine.

Figure 2:
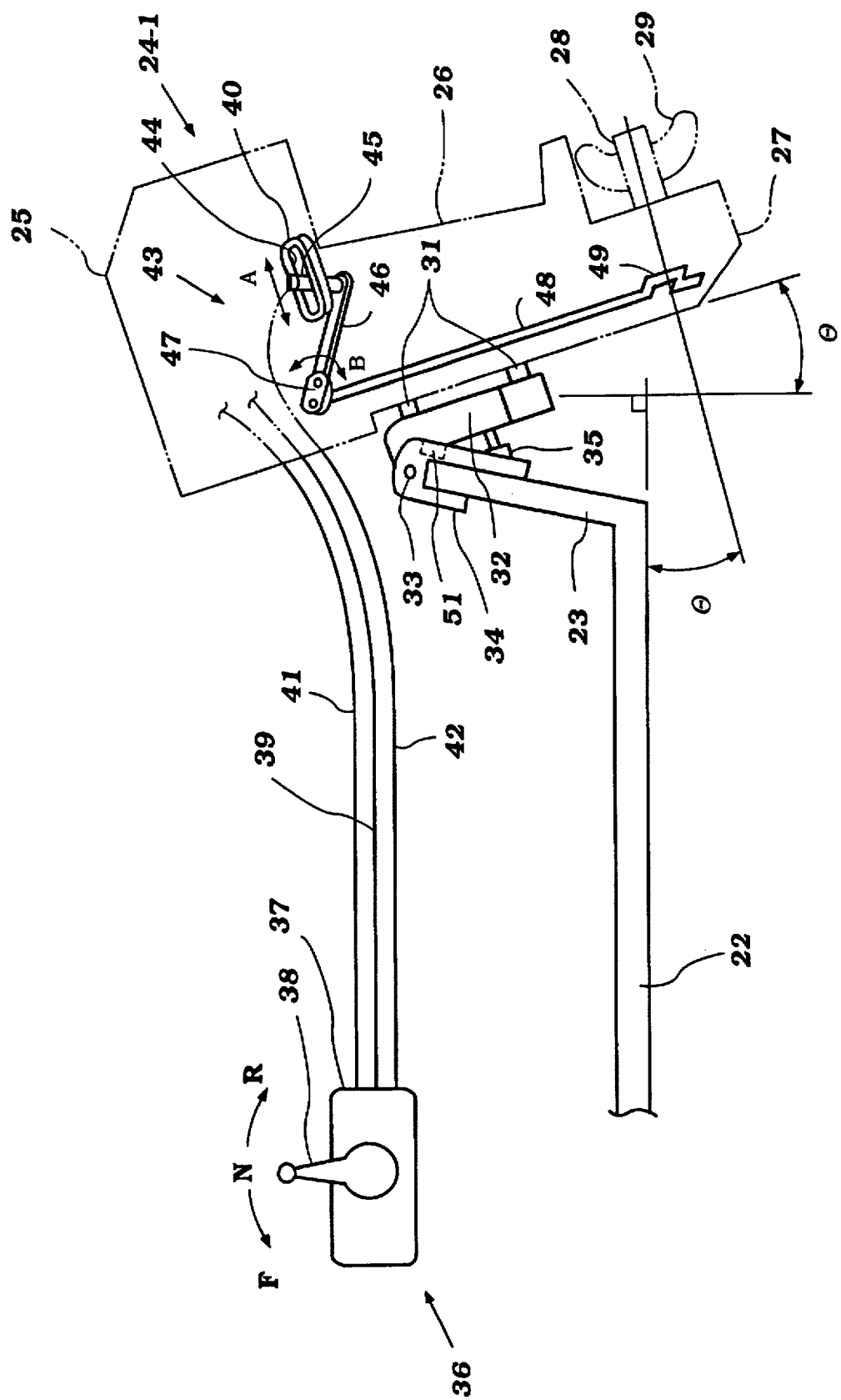
FIG. 2 is a side elevational view of a portion of the watercraft and specifically of one of the propulsion devices and its operator controls.

As has been noted, the propulsion devices 24-1 and 24-2 are outboard motors and these motors are shown in more detail in FIG. 2 wherein their attachment to the transom 23 of the watercraft 22 is also shown in more detail. Each outboard motor includes a powerhead, shown in phantom and indicated by the reference numeral 25. This powerhead contains a powering internal combustion engine which, as previously noted, may be of any known type or configuration. In the exemplary embodiment that will be described, this engine is of the V-6 two-cycle crankcase compression type. For the reasons already noted, the invention can be utilized with a wide variety of types of engines other than that specifically described.

As is typical with outboard motor practice, the engine in the powerhead 25 is mounted so that its output shaft or crankshaft rotates about a vertically extending axis. This facilitates connection to a drive shaft (not shown) that depends into and is rotatably journaled in a drive shaft housing 26.

This drive shaft continues on to a lower unit 27 in which a forward neutral reverse transmission of a known, bevel gear type, is positioned. This transmission drives a propeller hub 28 from which propeller blades 29 extend in a known manner. In applications employing dual outboard motors as described, each propeller 29 preferably rotates in a direction opposite to the other during both the forward and reverse drive modes.

Each outboard motor has a steering shaft affixed, as by brackets 31, to its drive shaft housing 26 in a known manner. These steering shafts are journaled for rotational movement about a vertically extending steering axis in a respective swivel bracket 32. The swivel bracket 32 is, in turn, pivotally connected by means of a pivot pin 33 to a clamping bracket 34. The pivotal connection provided by the pivot pin 33 permits tilt and trim movement of the outboard motors 24 as is well known in this art.

A hydraulic motor and shock absorbing assembly, indicated generally by the reference numeral 35, is interposed between the transom 23 of the watercraft and the outboard motors 24 for accomplishing controlled tilt and trim movement. These hydraulic motors 35 also may include shock absorbing mechanisms which permit the outboard motors 24 to pop when underwater obstacles are struck.

The clamping brackets 34 incorporate clamping mechanisms for attaching them to the transom 23 of the hull 22 in a well known manner.

As has been noted, the outboard motors 24 include a transmission which permits shifting between a forward, neutral and reverse position. In addition, the engine of the powerhead 25 is provided with some form of engine speed control which may constitute one or more throttle valves (as will be described by reference to FIG. 3) of the engine.

As is typical with marine practice, a single lever control, indicated generally by the reference numeral 36 may be mounted in the hull 22 at a position convenient to the operator and spaced from the transom 23. The single lever control 36 includes a base assembly 37 and an operator-controlled lever 38. The lever 38 is connected by a first set of bowden wire actuators 39 and 41 to the engine speed control. In addition, a connection is provided by a bowden wire actuator 42 to a transmission shift control, shown in part in perspective view in this Figure and indicated generally by the reference numeral 43.

As those skilled in this art will readily understand, the single lever control 38 is movable between a neutral position indicated at N to a forward drive position F or a reverse drive position R. Generally, the way the system operates is that the single control lever 38 is movable through a first range from its neutral position to either the forward or reverse drive positions wherein the transmission, operated through the linkage system which will be described, moves from its neutral to its forward or reverse drive positions. After engagement of the clutches of the transmission has occurred, continued movement of the lever 38 will cause the throttle or engine speed controls to continue to open to permit increase in the engine's speed.

Although the throttle control is not shown in detail because it is conventional, a portion of the transmission control is shown although that also is conventional. This transmission control includes a control lever 40 which is pivotally supported within the powerhead 25 and which defines a cam groove 44 in which a follower pin 45 is received. The follower pin 45 is mounted at one end of a shift control lever 46 which is connected by a coupling 47 to a shift control rod 48. The shift control rod 48 has a crank arm 49 at its lower end that cooperates with a suitable mechanism for effecting the operation of the transmission in the lower unit 27. Again, this mechanism is generally of the type known in the art and, since this mechanism forms no significant part of the invention, a further description of it is not believed to be necessary to permit those skilled in the art to practice the invention.

Figure 3:
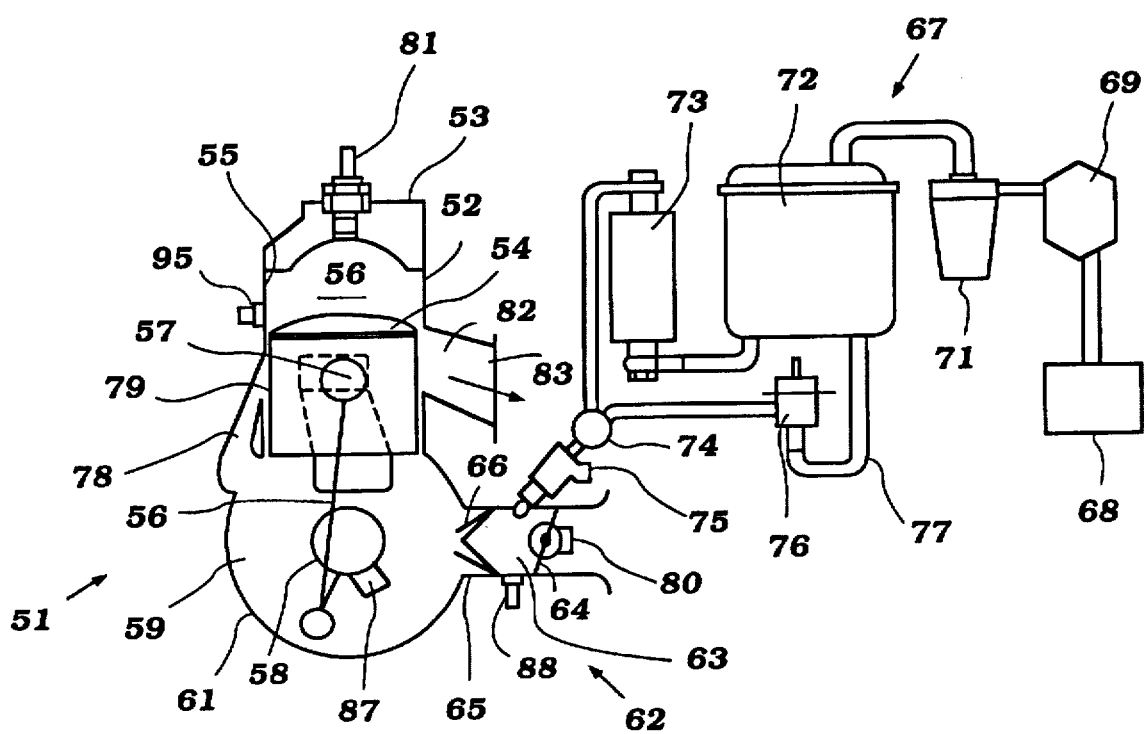
FIG. 3 is a partially schematic, cross sectional view of the engine of the one propulsion units taken through one of its cylinders and showing the fuel supply system in part.

Referring now primarily to FIG. 3, a portion of the engine of the powerhead 25 is depicted and is identified generally by the reference numeral 51. The engine 51, as has been previously noted, is in a preferred embodiment a two-cycle engine having a V-6 configuration. Such engines are normally used as propulsion units in outboard motors and for this reason a two-cycle engine of this configuration is described. In fact, however, FIG. 3 only shows a single cylinder of the engine but it will be readily apparent to those skilled in the art how the invention can be practiced with engines having other cylinder numbers and other cylinder configurations. Also, although the invention is described in conjunction with a two-cycle engine, it should be apparent to those skilled in the art that the invention can also be utilized with four-cycle engines.

It should also be recognized that the following description of the engine 51 is only to permit those skilled in the art to understand the general environment in which the invention can be utilized. Therefore, where any details of the engine 51 or its supporting components are either not illustrated or are illustrated only schematically, reference may be had to any construction known in the art.

The engine 51 includes a cylinder block 52 that is closed by a cylinder head 53 that is affixed thereto in a known manner. A piston 54 reciprocates in a cylinder bore 55 of the cylinder block and defines with the cylinder bore 55 and the cylinder head 53 a combustion chamber 56. The piston 54 is connected to the small end of a connecting rod 56 by means of a piston pin 57. The big end of the connecting rod 56 is journaled on a throw of a crankshaft 58.

The crankshaft 58 is journaled for rotation in a crankcase chamber 59 that is formed by the cylinder block 52 and more specifically by a skirt thereof and a crankcase member 61 that is affixed to the cylinder block skirt in a known manner. As has been noted and as is typical with outboard motor practice, the engine 51 is mounted so that the rotation axis of the crankshaft 58 is in a vertical orientation.

Since the engine 51 in the described embodiment operates on a two-cycle crankcase compression principle, the crankcase chambers 59 associated with each of the cylinder bores 55 are sealed from each other in a known manner.

An air induction system, indicated generally by the reference numeral 62 is provided for delivering an air charge to the combustion chambers 56 through the crankcase chambers 59. This induction system includes an air inlet device that draws atmospheric air from within the protective cowling of the powerhead in a well known manner.

This air is then delivered to a throttle body 63 in which a throttle valve 64 is rotatably journaled. This air then flows to intake ports 65 formed in the crankcase chamber 59. Reed-type check valves 66 are provided in these intake ports 65 so as to permit a charge to flow into the crankcase chambers 59 but which act to prevent reverse flow when the pistons 54 are moving downwardly to compress the charge in the crankcase chambers 59.

Fuel is mixed with the air in the throttle body 63 and is supplied by a fuel supply system, indicated generally by the reference numeral 67. This fuel supply system 67 includes a fuel tank 68 which is mounted in the hull 22 of the watercraft. A low-pressure pump 69, which may be driven by the engine 51 in a known manner, draws fuel from this remote tank 68 through a suitable conduit and passes it through a filter 71. The fuel then enters a fuel vapor separator 72 which functions to remove fuel vapors and air from the fuel so as to prevent vapor lock and intermittent fuel injection.

A high pressure pump 73 draws fuel from the fuel vapor separator 72 and delivers it to a fuel rail 74. Although the fuel pump 73 is shown in a separate location, in actual practice the high-pressure fuel pump 73 may be actually contained within the body of the fuel vapor separator 72.

The fuel rail 74 supplies fuel to a plurality of fuel injectors 75, one for each combustion chamber of the engine. The fuel injectors 75 are mounted preferably in the throttle body 63 and spray fuel downstream of the throttle valve 64 toward the reed-type check valve 66.

Fuel is maintained at the desired pressure in the fuel rail 74 by a pressure regulator 76. The pressure regulator 76 maintains the desired pressure by dumping excess fuel back to the fuel supply system, for example, to the vapor separator 72 through a return conduit 77.

The fuel and air which is thus delivered to the crankcase chambers 59 is then transferred to the combustion chambers 56 through one or more scavenge passages 78 that extend from the crankcase chambers 59 to the cylinder bores 55 where they end in scavenge ports 79. This charge is then further compressed in the combustion chamber 56. At an appropriate time interval, as will be described, this charge is ignited by one of a plurality of spark plugs 81 that are mounted in the cylinder head 53 and each of which has its gap disposed in a respective one of the combustion chambers 56.

The charge burns and expands and then eventually opens an exhaust port 82 formed in the cylinder bore 55 and which communicates with an exhaust system shown partially and schematically and indicated by the reference numeral 83. As is typical with outboard motor practice, this exhaust system may discharge under high-speed/high-load conditions through an underwater exhaust gas discharge which may be formed in the hub 28 of the propeller 29. In addition, an above-the-water, more restricted low-speed exhaust gas discharge may also be provided, as is well known in this art.

Since the back pressure on the engine can affect the engine performance, the outboard motor 24 is provided with a trim angle sensor, indicated schematically by the reference numeral 84 which measures the angles θ between the steering shaft and a vertical as shown in FIG. 2. This angular measurement by the trim angle sensor 84 is utilized in engine control, as will be described.

In connection with the basic engine control, there are certain types of sensors which may be incorporated and, although the engine is not shown in detail, those skilled in the art will readily understand the type of sensors which are described and those which are available in the art and which may be utilized to practice the invention. In addition to the trim sensor 84 described, additional sensors may be employed.

This basic engine control will now be described by primary reference to FIGS. 2 through 4 wherein the various sensors are shown in a schematic fashion. Even though the showing and description is schematic, those skilled in the art will readily understand how to practice the invention in conjunction with actual physical embodiments.

The control includes an ECU 85 controls a capacitor discharge ignition circuit and the firing of spark plugs 81. The spark plugs 81 and other components of the system which are associated with a particular cylinder of the engine have their reference characters noted with a suffix showing the specific cylinder number.

In addition, the ECU controls the engine fuel injectors 75 so as to control both the beginning and duration of fuel injection and the regulated fuel pressure, as already noted. The ECU 85 operates on a strategy for the spark control and fuel injection control as will be described. This system employs an exhaust sensor assembly indicated generally by the reference numeral 86. This sensor is preferably an oxygen ($O_2$) sensor of any known type.

The sensors employed further include a crankshaft position sensor 87 which senses the angular position of the engine crankshaft and also the speed of its rotation. A crankcase pressure sensor may also provided for sensing the pressure in the individual crankcase chambers. Among other things, this crankcase pressure signal may be employed as a means for measuring intake air flow and, accordingly, controlling the amount of fuel injected by the injectors 75, as well as their timing.

An air temperature sensor 88 may be provided in the intake passage downstream of the engine throttle valves 64 for sensing the temperature of the intake air. In addition, the position of the throttle valves is sensed by a throttle position sensor 89.

In accordance with some portions of the control strategy, it may also be desirable to be able to sense the condition of the described transmission for driving the propeller 29 or at least when it is shifted into or out of neutral. Thus, a transmission condition sensor 91 is mounted in the powerhead and cooperates with the shift control mechanism for providing the appropriate indication.

As noted, the trim angle sensor 84 is provided for sensing the angular position of the swivel bracket 32 relative to the clamping bracket 34. This signal can be utilized to determine the exhaust back pressure.

Continuing to refer primarily to output signals which includes the its input and output signals which includes the output signals to the fuel injectors 75 and the spark plugs 81 for controlling the time of beginning of injection of each of the fuel injectors 75, the duration of injection thereof and also the timing of firing of the spark plugs 81. Certain of the detectors for the engine control have already been described and these include the oxygen sensor 86, the crank angle sensor 87, the intake air temperature sensor 88, the throttle position detector 89, the transmission neutral detector switch 91 and the trim angle sensor 84. In addition, each cylinder is provided with a respective detector 92 which is associated with the crankshaft and indicates when the respective cylinder is in a specific crank angle. This may be such a position as bottom dead center (BDC) or top dead center (TDC). These sensors cooperate along with the basic crank angle position sensor 87 and provide indications when the respective cylinders are in certain positions, as noted.

There is also provided an engine temperature sensor 93 which is mounted in an appropriate body of the engine and which senses its temperature. As will become apparent, the output of the engine temperature sensor 93 may be utilized also to detect when the engine is in an over-heat mode and initiate protective action so as to permit the engine to continue to operate, but restrict its speed if an over-temperature condition exists. This speed limitation may be accomplished by disabling the operation of one or more of the engine cylinders. As will also become apparent, the actual cylinder which is disabled may be changed during this protective running mode so that all cylinders will fire at least some times, but certain cylinders will be skipped during one or more cycles. This will ensure against plug fowling, etc. during this protective mode.

There is also provided an atmospheric air pressure detector 94 that provides a signal indicative of atmospheric air pressure for engine control.

Figure 4:
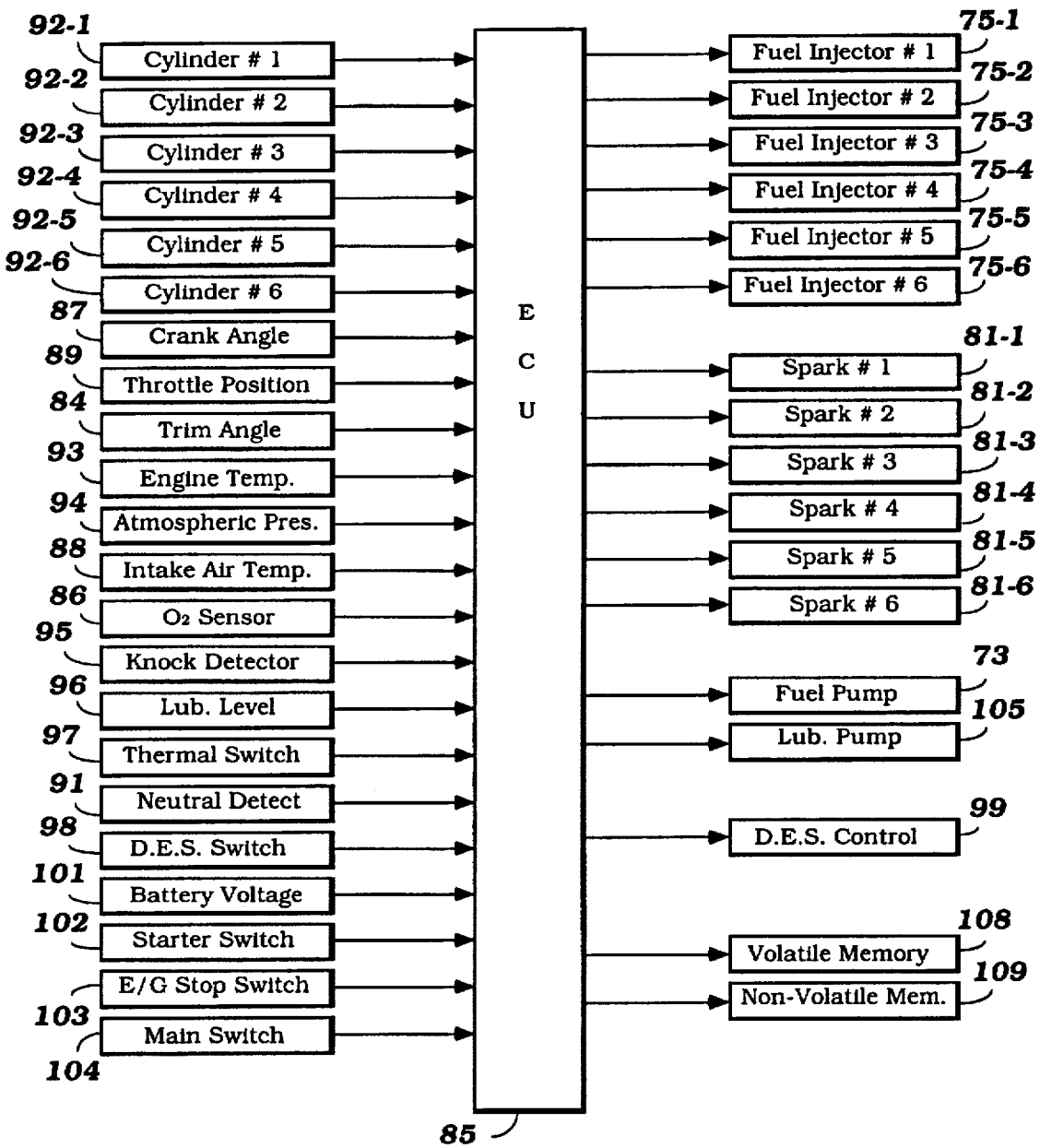
FIG. 4 is a diagrammatic view showing the relationship of the various detectors of the propulsion unit controls to the ECU and the relationship of the ECU to certain controlled portions of the engine, specifically the fuel injectors, ignition system, fuel pump, and oil pump.

The engine may also be provided with a knock detector 95, which appears schematically in FIGS. 3 and 4 and which outputs a signal when an knocking condition is encountered. Any appropriate control may be utilized for minimizing knocking, such as changing spark timing and/or fuel injection amount and timing as will also be discussed later.

The engine may be provided with a separate lubricating system that includes a lubricate tank. Thus there may be provided a lubricant level detector 96 that also provides a signal indicative of when the lubricant level is below a predetermined value. Like overheat conditions, this low lubricant level may be employed as a warning and the engine speed can be limited when the lubricant level, as sensed by the sensor 96, falls below a predetermined level. Any well known system for accomplishing this can be provided.

In addition to the engine temperature sensor 93, there may be also provided a thermal switch 97 that can be set to signal when an over-temperature condition exists as opposed to utilizing the output of the engine temperature sensor 93.

In applications where there are two outboard motors 24 mounted on the transom 23 of the same watercraft, as illustrated, if an abnormal conditions exists in one of these outboard motors and its speed is limited in the aforenoted manner, it is also desirable to ensure that the other outboard motor also has its speed limited. This improves directional control. There have been disclosed in the prior art various arrangements for providing this interrelated control and such a control is indicated schematically as 98 and is referred to as a DES (Dual Engine System) detector. This is a crossover circuit, indicated schematically at 99, which provides the signal for engine speed control to be transmitted to the normally operating engine as well as to the abnormally operating engine for the aforenoted reasons.

In addition to the actual engine and transmission condition detectors there may also be provided detectors that detect the condition of certain controls and auxiliaries such as a battery voltage detector 101, a starter switch detector 102 associated with a starter switch which controls an engine starter motor (not shown) and an engine stop or kill switch detector 103.

If battery voltage is below a predetermined value, certain corrective factors may be taken. Also, when the engine starter switch is actuated as indicated by the starter switch detector 102, the program can be reset so as to indicate that a new engine cycle of operation will be occurring. The engine stop switch detector 103 is utilized so as to provide a shutdown control for stopping of the engine which also may be of any known type. There is also provided a main switch 104.

In addition to those inputs noted, various other ambient engine or related inputs may be supplied to the ECU 85 for the engine management system.

The ECU 85 also is provided with a memory that is comprised of a volatile memory 108 and a nonvolatile memory 109. The volatile memory 108 may be employed for providing certain learning functions for the control routine. The nonvolatile memory 109 may contain maps for control during certain phases of non-feedback control, in accordance with the invention. The ECU 85 also controls, in addition to the fuel injectors 75 and the firing of the spark plugs 81, the high pressure fuel pump 73 and the lubricating pump which has been referred to but which has not been illustrated in detail. This lubricating pump is shown schematically at 105 in FIG. 4. Obviously, those skilled in the art will understand how these various controls cooperate with the components of the engine to provide their control, as will become apparent.

Figure 5:
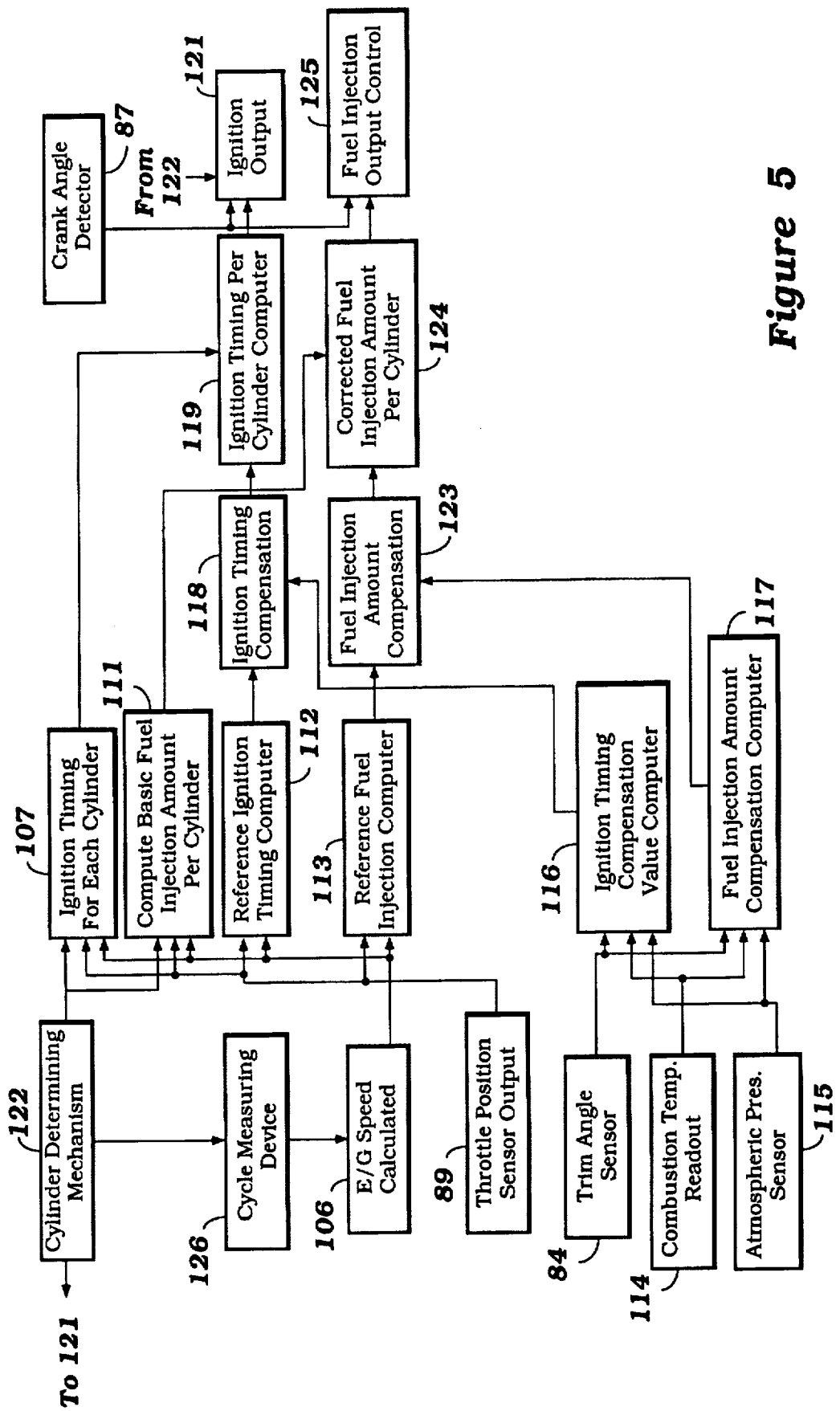
FIG. 5 is a further block diagram showing how the various detectors are interrelated to the various computing portions of the ECU and the outputs to the ignition and fuel controls.

Referring now to FIG. 5, this figure illustrates certain of the sensor outputs previously referred to and particularly in connection with FIG. 4 and the various sections of the ECU 85 and how they interrelate with each other so as to provide the basic fuel injection and ignition controls. This figure is obviously schematic and does not show all of the interconnections between the various sensors and control sections of the ECU 85. However, this figure is useful in permitting those skilled in the art to understand how the systems are interrelated before the actual control sequence will be described. FIG. 5 also shows primarily the method and apparatus by which the determination of the basic fuel injection timing and amount and ignition timing are determined.

Referring now specifically to this figure, the system includes a first section wherein the basic ignition timing, fuel injection timing and duration are computed. These basic timings and amounts are made from measuring certain engine parameters such as engine speed and load. In this embodiment, engine speed, calculated at the section 106, is determined by counting the number of pulses from the crank angle sensor 87 in a unit of time. In addition to providing the signal indicative of crank angle, by summing the number of pulses from the sensor 87 in a given time interval it will be possible to determine the actual engine rotational speed.

In addition to measuring the engine speed in order to obtain the basic control parameters, the engine load is also measured. This is done by utilizing the output of the throttle position sensor 89 although various other factors which determine the load on the engine can be utilized.

The outputs from the engine speed determination and throttle opening or load are sent to a number of calculating sections in the ECU 85. These include a section 107 that computes the ignition timing for each cylinder. This information is derived from an appropriate map such as may be reserved in the aforenoted nonvolatile memory 109 and is based upon the time before or after top dead center for each cylinder. By taking this timing and comparing it with the actual crankshaft rotation, the appropriate timing for all cylinders can be calculated.

In addition, the basic maps aforereferred to also contain an amount of fuel required for each cylinder for the sensed engine running conditions. This is in essence a basic fuel injection amount computation made in a section 111. This computation may be based either on fuel volume or duration of injection timing. Air flow volume and other factors may be employed to set the basic fuel injection amount.

The outputs from the engine speed calculation 106 and engine load or throttle position sensor 89 are also transmitted to a reference ignition timing computer 112 and a reference fuel injection computer 113. In addition to the outputs of the basic engine condition sensors (speed and load in the described embodiment) there are also other external factors which will determine the optimum basic fuel injection timing duration and ignition timing. These may include among the other things, the trim angle of the outboard motor as determined by the trim angle sensor 84 and the actual combustion temperature as indicated by a sensor indicated schematically at 114. Furthermore, the atmospheric or barometric pressure, all previously referred to also is significant and this is read by an appropriate sensor 115.

The outputs from these sensors 84 and 114 are transmitted to an ignition timing compensation computer section 116 and a fuel injection amount compensating computer 117. These compensation factors are determined also based upon known value maps programmed into the ECU 85.

The outputs from the reference ignition timing computer 112 and the compensation value computer 116 are transmitted to an ignition timing compensating circuit 118. This then outputs a signal to the ignition timing per cylinder compensating circuit 119 which receives also signals from the unit 107 that sets the ignition timing for each cylinder. This then determines the appropriate timing for the ignition output from a driver circuit 121 for firing the individual spark plugs 81.

The crank angle detector 87 also is utilized to determine the appropriate ignition timing as is the output from a cylinder determination means, indicated generally by the reference numeral 122 and which determines, in a way which will be described, which individual cylinder is to be fired, depending upon the angular position of the crankshaft. A similar system is employed for the fuel injection volume control. That is, a section 123 receives the reference fuel injection amount signal from the section 113 and the compensation amount from the section 117 and processes a corrected fuel injection amount. This is then transmitted to the section 124 which also receives the basic fuel injection amount per cylinder calculation from the section 111 to determine the corrected fuel injection amount per cylinder. This amount is then output to a fuel injector control circuit 125 which again receives the signals from the crank angle detector and cylinder determinator to supply the appropriate amounts of fuel to each cylinder by controlling the duration of opening of the fuel injector. Timing for the beginning of injection may also be controlled in a like manner. The system also includes a cycle measuring arrangement 126 which determines the actual cycle of operation as will also be described later.

Figure 6:
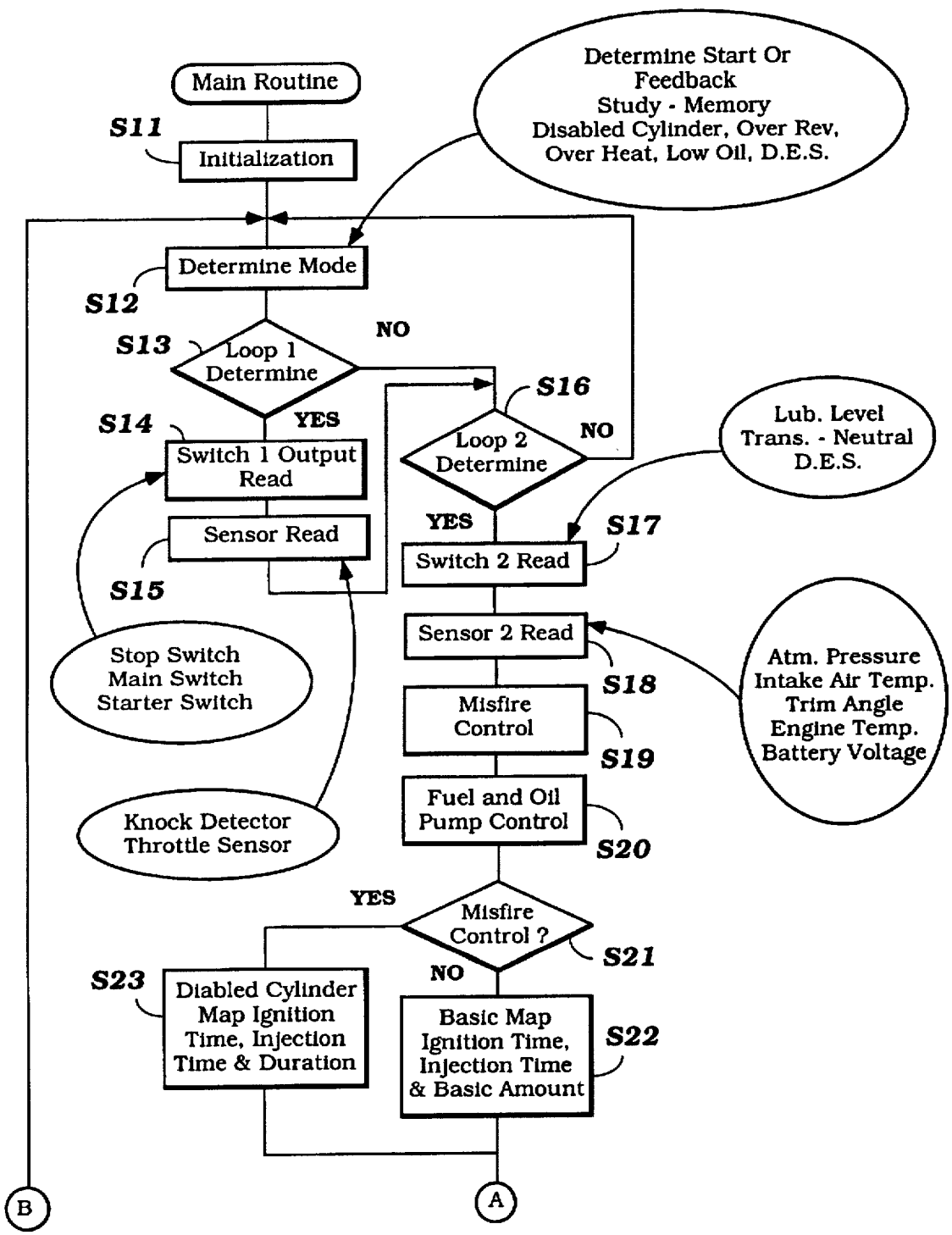
FIG. 6 is a partial block diagram showing the initial portion of the main control routine wherein the system provides the control depending upon whether or not a cylinder is disabled to slow the engine speed because of an encountered abnormality that could cause engine damage if not controlled.

The basic control routine by which the actual fuel injection timing amount and ignition timing are determined will now be described beginning by reference to FIG. 6 and carping on to those figures which follow it. As will become apparent, the basic concept operates primarily to set a basic fuel injection amount and timing determined by engine speed and load as aforenoted. Once the system is operating and the oxygen sensor 86 is at its operating temperature, the system shifts to a feedback control system. This feedback control system is superimposed upon the basic fuel injection amount and timing and spark timing so as to more quickly bring the engine to the desired running condition.

The output or combustion condition in one combustion chamber only is sensed and that signal is employed for controlling the other cylinders. In addition, there are some times when cylinders are disabled to reduce the speed of the engine for protection, as has also been noted. This system ensures proper control also during these times even if the disabled cylinder is the one with which the sensor is associated.

The control routine will now be described initially by reference to FIG. 6 with the discussion continuing onto the remaining figures where necessary. The program starts and goes to the step S11 where the system is initialized. The program then moves to the step S12 wherein the ECU 85 determines the operational mode. This operational mode may be of one of many types such as starting, normal running and stop and is based upon primarily the results of the inputs from the sensors as shown in FIG. 4.

As noted the available modes may include start-up mode when the engine is first started. As previously noted, there is a starter switch 102 and, when the starter switch has been initiated and the program has just begun, the ECU 85 will assume the starting mode and go into the appropriate control routine for that starting mode as will be described later in more detail by reference to FIG. 13. This start up mode of operation will employ neither feedback control nor necessarily sensing of engine running conditions, but rather set the appropriate parameters for engine starting and/or warm-up as will be described in more detail later as this control is that to which the invention primarily relates.

Another potential mode is the operation when a cylinder or more is being disabled to effect speed control and protection for a so-called "limp home" mode. This mode will also be described later by reference to certain of the remaining figures and is based upon the sensing of other conditions which will now be also mentioned.

The disabling of cylinders to protect the engine may occur in response to the sensing of a number of critical features. One of these features is if the engine is operating at too high a speed or an over-rev condition. Another condition is if the engine temperature is too high or is approaching a high level where there may be a problem. Another feature, as has been noted, is if there is a low oil level in the oil reservoir. A still further condition is if there is a dual engine system and one of the engines experiences one of the aforenoted conditions and, thus, both engines will be slow even though one engine may not require this.

Having determined the operational mode at the step S12, the program moves to the step S13 to determine which of the two time programs or control loops are presently occurring. The system is provided with two separate control loops: loop 1, which repeats more frequently than the other loop (loop 2). The timing for loop 1 may be 4 milliseconds and the timing for loop 2 may be 8 milliseconds. These alternative control loops are utilized so as to minimize the memory requirements and loading on the ECU 85.

Figure 8:
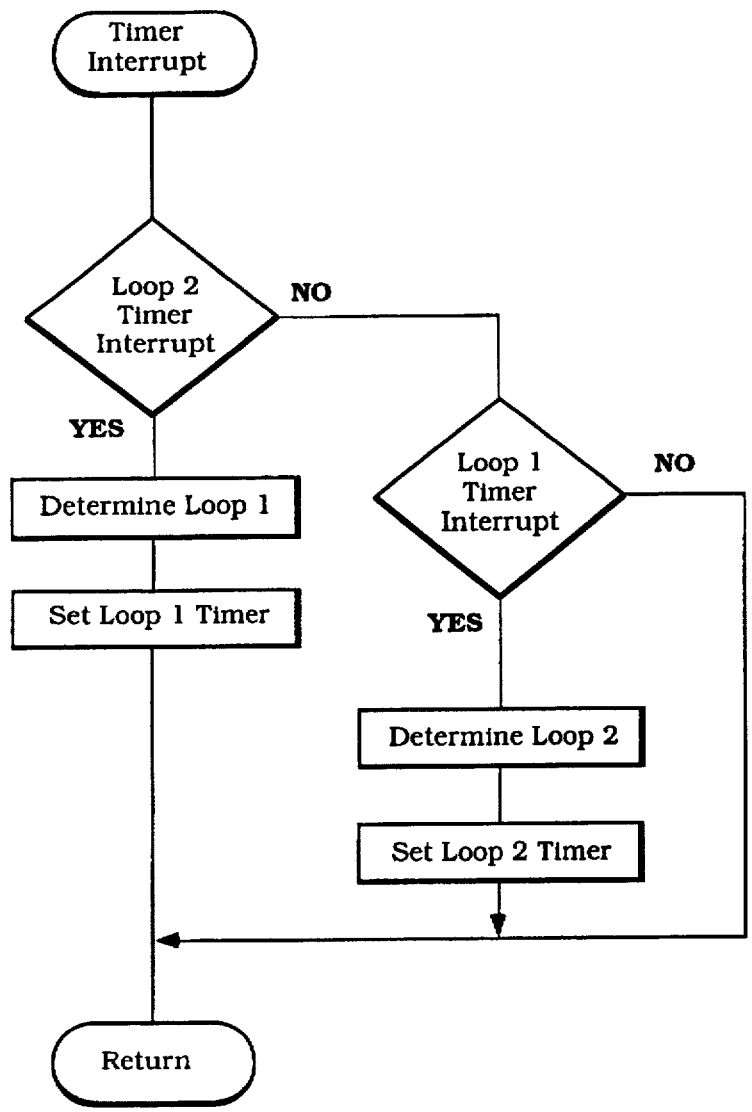
FIG. 8 is a block diagram showing the control routine of the timer interrupt sequence of operation.

FIG. 8 shows how the system determines which control loop the program is operating on. As may be seen in this figure, it begins when the timer is interrupted and then moves to the first step to determine if loop 2 timer has been interrupted. If it has not, the program moves to a step to determine if the loop 1 timer has been interrupted. If it has not, the program then returns. If, however, it is determined that the loop 1 timer has been interrupted, then the program moves to the next step to determine that the system is operating on loop 2 and then moves to set the timer for loop 2.

If, however, at the first step it is determined that the loop 2 timer has been interrupted, then the program moves to the next step to determine that loop 1 is being run and the program move to the next step to set loop 1 timer. Regardless of which timer is set, the program then returns.

Assuming that the loop 1 mode has been determined at the step S13, the program moves to the step S14, first to read the output of certain switches. These switches may include the main engine stop or kill switch 103, the main switch for the entire circuit 104 or the starter switch 102. The purpose for reading these switches is to determine whether the engine is in the starting mode or in a stopping or stopped mode so as to provide information when returning to the step S12 to determine the proper control mode for the ECU 85 to execute. Again this will be explained further by reference to FIG. 13.

Having read the switches at the step S14, the program moves to the step S15 so as to read certain engine switch conditions which may determine the necessary mode. These switches may include, for example, the output from the knock detector 95 and/or the output from the throttle position sensor 89.

If loop 1 is not being performed at the step S13 or if it and the steps S14 and S15 have been completed, the program moves to the step S16 to determine if the time has run so as to initiate the loop 2 control routine. If the time has not run, the program repeats back to the step S12.

If the system is operating in the loop 2 mode of determination, the program then moves to the step S17 to read the output from certain additional switches. These switches can constitute the lubricant level switch 96, the neutral detector switch 91 and the DES output switch 98 to determine if any of these specific control routines conditions are required.

Having read the second series switches at S17, the program then moves to the step S18 to read the outputs from additional sensors to those read at the step S15. These sensors include the atmospheric air pressure sensor 94, the intake air temperature from the sensor 88, the trim angle from the trim angle sensor 84, the engine temperature from the engine temperature sensor 93 and the battery voltage from the battery sensor 101.

The program then moves to the step S19 to determine if cylinder firing disabling is required from the outputs of the sensors already taken at the steps S17 and/or S18. The program then moves to the step S20 so as to provide the necessary fuel pump and oil pump control.

The program then moves to the step S21 to determine if the system should be operating under normal control or misfire control. If no misfire control is required because none of the engine protection conditions are required, then the program moves to the step S22 to determine from the basic map the computation of the ignition timing, injection timing and amount of injection per cylinder. As has been previously noted, this may be determined from engine speed and engine load with engine load being determined by throttle valve position. This basic map is contained in the nonvolatile memory 109 of the ECU 85 as previously noted.

If at the step S21 it is determined that the program requires misfire or speed control by eliminating the firing of one cylinder, the program moves to the step S23 to determine from a further map, referred to as a disabled cylinder map, the ignition timing and injection timing and duration. This map is also programmed into the nonvolatile memory 109 of the ECU 85 from predetermined data and is based upon the fact that the engine will be running on a lesser than total number of cylinders.

Figure 7:
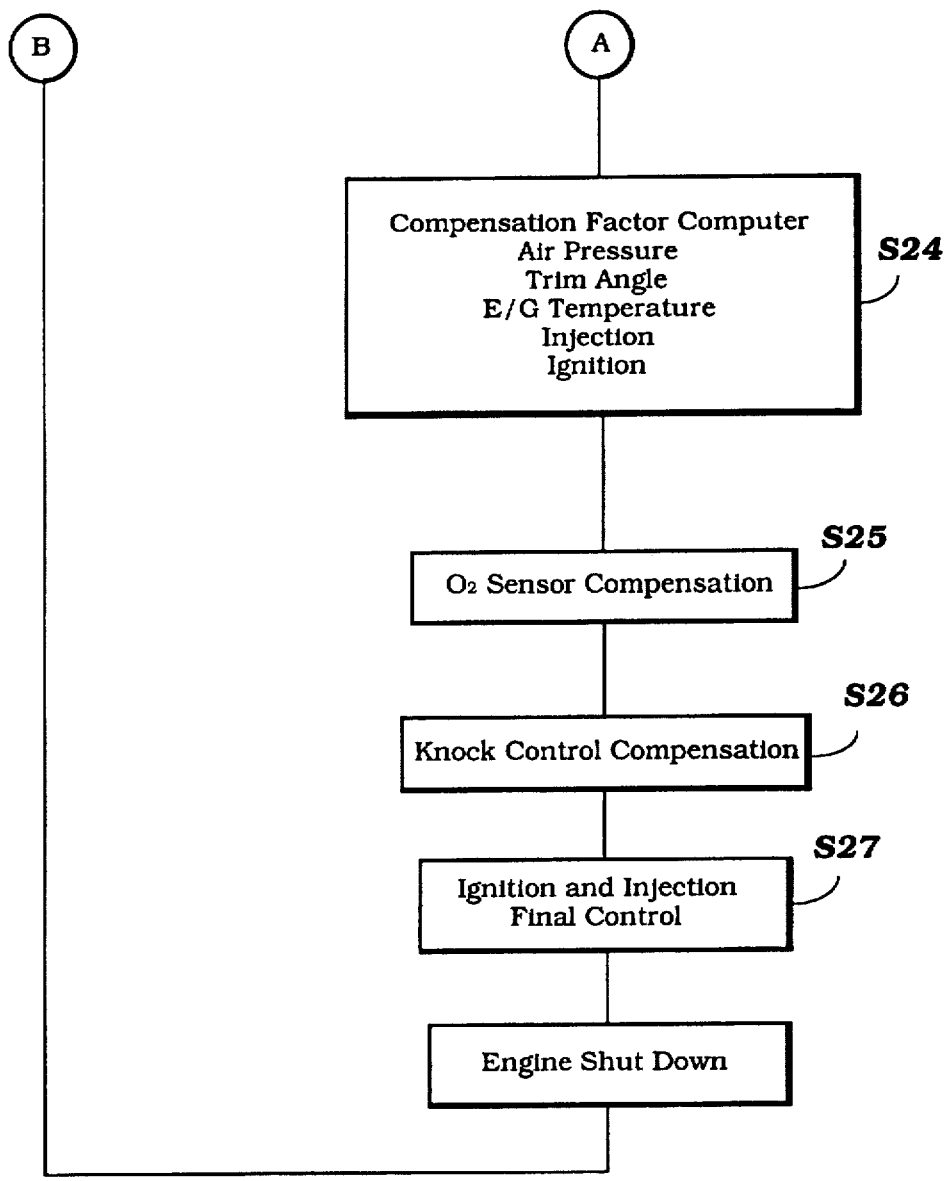
FIG. 7 is a partial block diagram of the remainder of the control routine shown in FIG. 6.

Once the basic ignition timing and injection timing and amount are determined at the appropriate steps S22 or S23, the program then moves to the step S24 (See now FIG. 7) so as to compute certain compensation factors for ignition and/or injection timing. These compensations are the same as those compensations which have been indicated as being made at the sections 118 and 119 and 123 and 124 of FIG. 5.

These compensation factors may include such outputs as the altitude pressure compensation, trim angle compensation and engine temperature compensation determined by the outputs from the sensors 94, 84, and 93, respectively. In addition, there may be compensation for invalid injection time and ignition delay made at the step S24.

The program then moves to the step S25 to determine if the engine is operating under oxygen feedback control and to make the necessary feedback control compensations based upon the output of the oxygen sensor 86.

The program then moves to the step S26 to determine if the output from the knock sensor 95 requires knock control compensation which may include either adjustments of spark timing and/or fuel injection amount. The program then moves to the step S27 so as to determine the final ignition timing injection timing and amount.

Another phase of the control routine will now be described by reference to FIG. 9. This phase has to do with the timing information primarily and certain procedure associated with the cylinder disabling mode for engine speed reduction and protection. The program begins when the timing sensor 87 indicates that the crankshaft is at top dead center. The program then moves to the step S28 to determine which cylinder it is that is at top dead center. This is done by utilizing the outputs of the cylinder position detectors 92.

The program then moves to the step S29 to ascertain from the order of approach of the cylinders to top dead center whether the engine is rotating in a forward or a reverse direction. It should be noted that, particularly on start-up, there is a possibility that the engine may actually begin to run in a reverse direction. This is a characteristic which is peculiar to two-cycle engines because of their inherent cycle operation.

If at the step S29 it is determined that the engine is rotating in a reverse direction, the program moves to the step S33 so as to initiate engine stopping. This may be done by ceasing the ignition and/or discontinuing the supply of fuel.

If at the step S29, however, it has been determined that the engine is rotating in the proper, forward direction, the program moves to the step S30 to measure the cycle of operation of the engine and then to the step S31 so as to actually compute the engine speed from the number of pulses from the crank position sensor 87 in relation to time, as previously noted. The program moves to the step S32 to determine if the engine speed is more than a predetermined speed. If the engine speed is too low, the program again proceeds to the step S33 where the engine is stopped.

If the engine continues to be operated, the program moves the step S34 to determine if the immediately detected cylinder is cylinder number 1. Cylinder number 1 is the cylinder with which the oxygen sensor 86 is associated. If the cylinder number 1 has not been the one that is detected, the program skips ahem to the point which will be discussed below.

If, however, it is determined at the step S34 that cylinder number 1 is the cylinder that is being immediately sensed, the program then moves to the step S35 to determine if the engine is operating in a cylinder disabling move. If it is not, the program moves to the step S36 so as to clear the register of the disabling information because the engine is now operating under a normal condition.

If, however, at the step S35 it is determined that the system is operating in the disabled cylinder mode so as to reduce or control maximum engine speed, the program moves to the step S37 to determine if the pattern by which the cylinder is disabled should be changed. As has been previously referred to, if the engine is being operated with one or more cylinders disabled so as to limit engine speed for the limp home mode, it is desirable to only disable a given cylinder for a predetermined number of cycles. If the disabling is extended, then on returning to normal operation the spark plug in the disabled cylinder may be fowled and normal operation will not be possible or will be very rough.

Thus, at the step S37 it is determined that the cylinder disabled has been disabled for a time period where it should be returned to operation, the program moves to the step S38. In the step S38, the disabling of the cylinder is switched from one cylinder to another in accordance with a desired pattern.

If it is not time to change the disabled cylinder at the step S37 or if the disabled cylinder number is changed at the step S38, the program then moves to the step S39 so as to set up or update the information as to the cylinder which is being disabled and the ignition disabling for that cylinder. The program then moves to the step S40 so as to actually step up the ignition pulse for the disabled cylinder and ensure that the cylinder will not fire. The program then moves to the step S41 so as to also ensure that the disabled cylinder will not receive fuel from the fuel injection. Then at the step S42, the disabling of injection pulse for the cylinder is also initiated. The program then moves to return.

Figure 9:
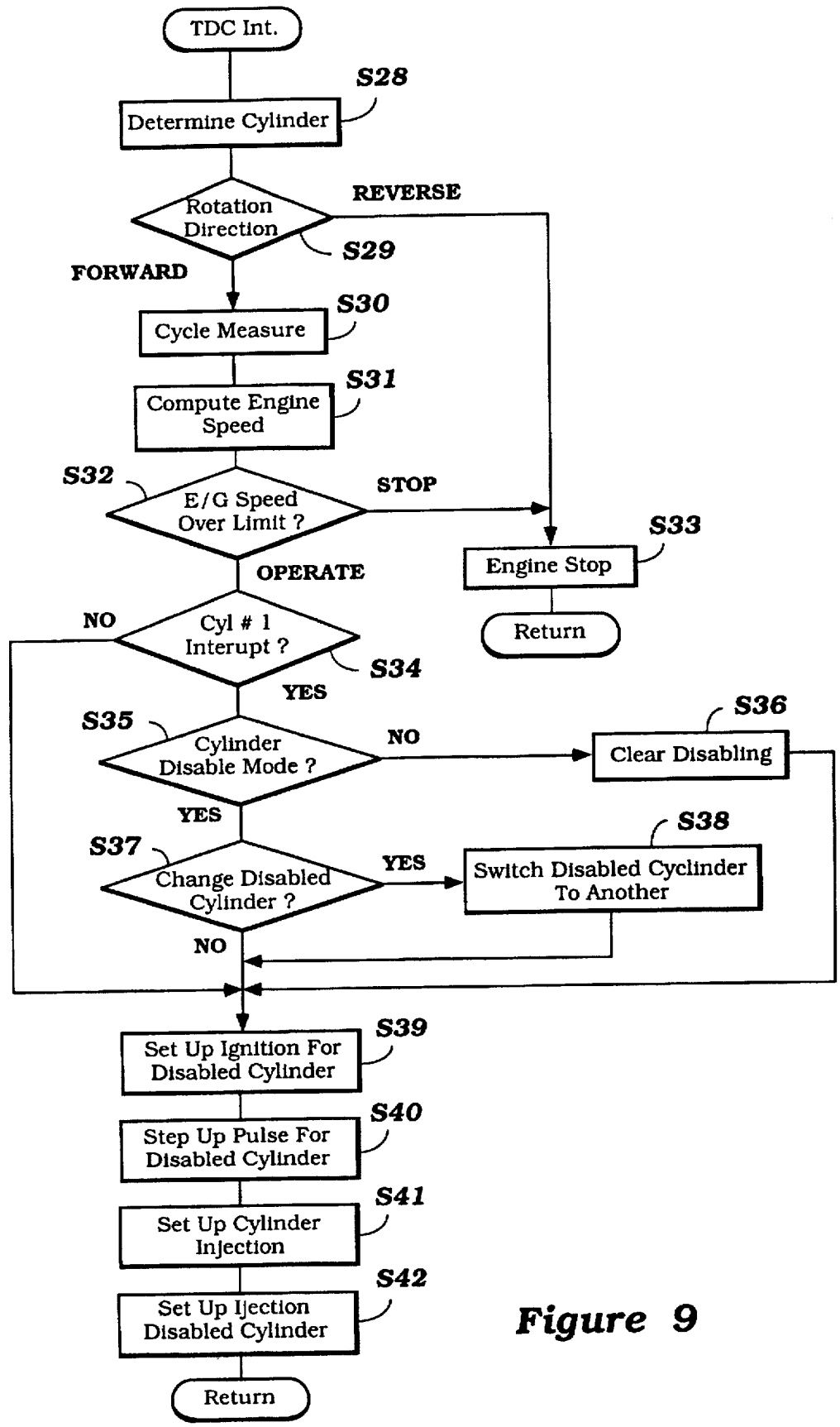
FIG. 9 is a further block diagram showing a further portion of the control routine including the condition when one cylinder is disabled to control or limit the engine speed.
Figure 10:
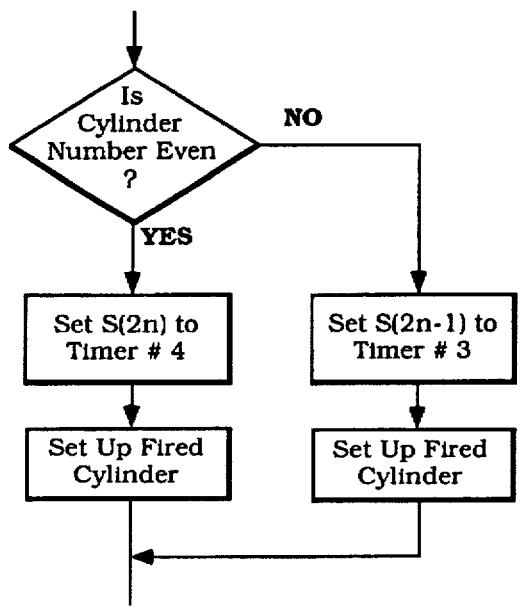
FIG. 10 is a block diagram showing a further portion of the control routine shown in FIG. 9 in sensing the respective cylinders.

FIG. 10 is a detailed subroutine that shows how the ignition pulse for the disabled cylinder at the step S40 in FIG. 9 is determined. In order to minimize the memory requirements and to permit faster computer operation, the system is provided with two timers, one associated with those cylinder numbers that are even, and one that is associated with those cylinder numbers that are odd (Timers #3 and #4). This cylinder number is based upon the firing order. Those skilled in the art will understand the advantages of using the two timers rather than a single timer. In the specific example, the engine is a V-6, as has been noted, and, therefore, the firing of the cylinders is at an equal 60° angle. The cylinders in one bank are even numbered while those in the other bank are odd numbered.

Timer number 3 is utilized for odd-numbered cylinders while timer number 4 is used for even-numbered cylinders. Hence, when the program initially begins to set up the ignition pulse for the cylinder at the step S4, it is determined at the initial step if the cylinder number to be controlled is an even number or an odd number. If it is an odd number, the program moves to the right-hand side so as to set the timer for cylinder number 3 to be equivalent to the determine cylinder times 2 minus 1, that is, S is (2n−1) for the timer. From this, then the timing for the next cylinder number on the odd sequence is set from this information.

On the other hand, if the cylinder number is even, the timer number 4 is utilized and the timing for the next cylinder is set as 2n. The program then moves to the next step so as to set up the appropriate ignition timing for this.

Figure 11:
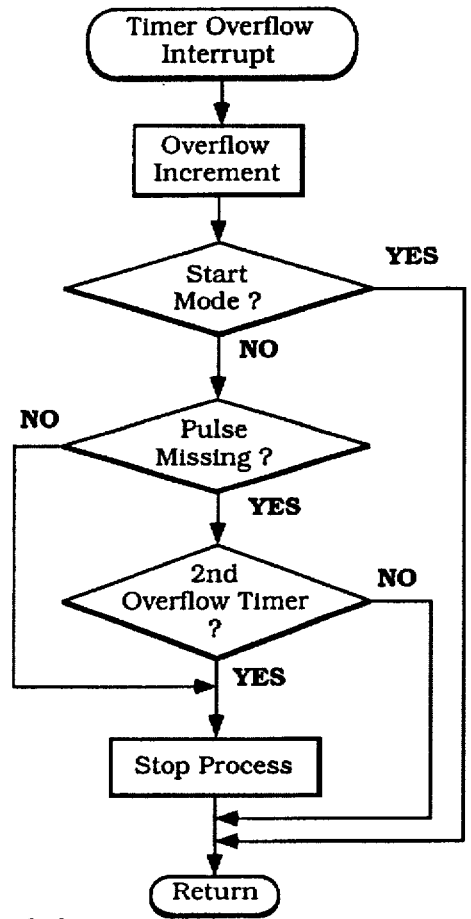
FIG. 11 is a block diagram showing a portion of the control for shut down utilized in FIG. 9.

FIG. 11 shows a control routine that is employed so as to stop the engine if the engine is running too slow. This is an explanation of the control routine which takes place basically in steps S30–S32 of FIG. 9.

If the engine is permitted to run at a speed that is too slow, the plugs will eventually foul and the engine will stall. If the engine is permitted to continue to run until its stalls, then restarting or resumption to normal operation will be difficult. Therefore, when the ECU 85 determines by the control routine of FIG. 11 that the engine is running too slow and fouling will occur to cause stalling, the engine is shut down before that occurs.

There is, therefore, set a timer which counts the time between successive ignition pulses. And thus, at the first step in this FIG., the timer overflow interruption is set and in the next step it is determined if the time between successive pulses is excessive because of an overflow of the timer then the program moves to a step to determine if the engine is in the original starting mode.

The reason it is determined if the engine is in original starting mode is that during initial engine starting the speed of the engine will be lower than the normal stalling speed at least initially. Thus, it is desirable not to effect stopping of the engine if the engine is in the original start-up mode because the engine would never be started otherwise. Thus, if it is determined at the start mode step of FIG. 11 that the engine is in the starting mode, the program jumps to the return.

If, however, it is determined that the engine is not in a starting mode, then the program moves to the next step to determine if a pulse has been missed. If a pulse has not been missed, as would be the case if there was a cylinder disabling for reducing the speed, then it is determined that the time interval is too long and the program immediately jumps to the step where the stopping process of the engine is initiated. Engine stopping is accomplished by discontinuing the firing of the ignition for all cylinders and/or the supply of fuel to all cylinders.

If, however, a pulse has been missed it may be because of the fact that the next successive cylinder is one which is not being fired in any event. Then the program moves to another step where the time between pulses is determined to be twice the normal pulse interval so as to accommodate a skipped cylinder. Thus, if the firing between two cylinders exceeds the time interval between 120° plus a time factor at this step, then it is assumed that the engine is running too slow and the program again initiates the stop process so as to stop running the engine and prevent plug fowling.

Figure 12:
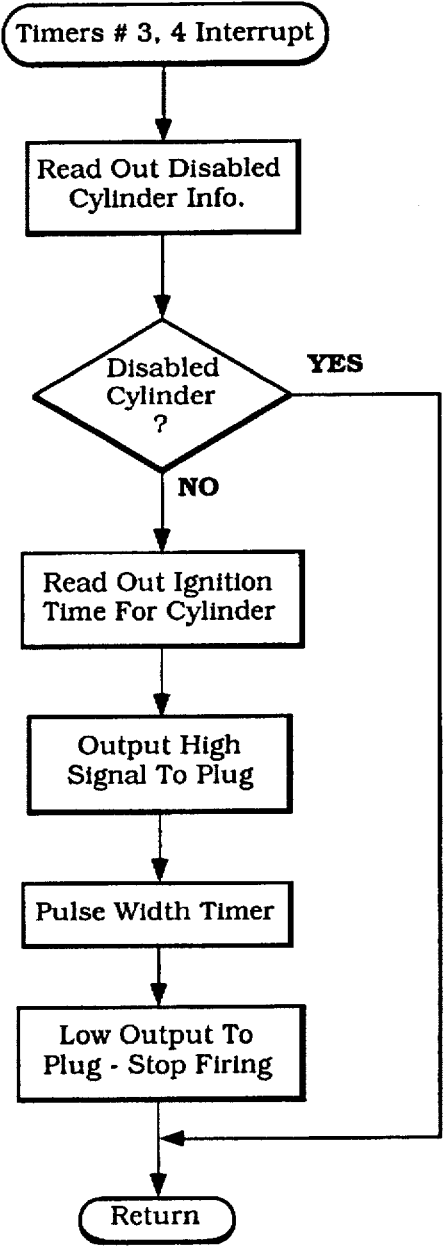
FIG. 12 is a block diagram showing more details of the control routine during cylinder disabling.

FIG. 12 shows the arrangement for controlling the condition when cylinders are disabled. This program starts out by reading the interruption phases from the pulses of the individual cylinders at timers #3 and #4. The program then moves to the next step to read out the disabled cylinder information and identify the cylinder which is being disabled.

The program then moves to the next step to see if the cylinder in question is the cylinder which is being disabled. If so, the program moves to return. If, on the other hand, the cylinder is not a disabled cylinder, then the program moves to the step to read the ignition output for that cylinder and determine the timing interval.

The program then moves to the next step to output a high pulse to the spark coil for that cylinder to effect its sparking.

The program then moves to the next step to set the pulse width timer for the duration of the plug firing, and finally to the step when the ignition output port is returned to the low value and ignition is discontinued.

Having described generally the basic concept by which basic engine running control is accommodated, the reader should have sufficient background to understand the facets involving the basic control upon which the control routine in accordance with which the invention is based. The invention here deals with the startup routine for the engine. During normal engine running not only are the spark plugs 81 fired in time sequence in accordance with the engine firing order but the same is also true with respect to the firing or injection of fuel from the fuel injector 75. That is, the ECU 85 establishes a control routine which determines when the injectors 85 associated with each of the cylinders will begin and end its injection. This timing of injection is such that the injection begins at a time which is slightly before it is desired to have the fuel actually reach the combustion chambers. This advance in injection timing is done so as to ensure that the fuel will be in the combustion chamber at the appropriate time.

Not only is there a delay in the beginning of fuel flow once the solenoid associated with the injector 75 is initiated but also there is time delay for fuel to flow through the system. Thus, the injector is set during normal running so as to supply an amount of fuel Q0 which is, as will be described later, adjusted in accordance with the compensation factor and also which is extended in time for a time to provide a flow amount Q2 so as to compensate for the lag in the actual delivery of fuel. This will be discussed in more detail later by principal reference to FIG. 16.

As has been noted, the system requires the ECU 85 to make a determination as to whether the engine is in a startup mode (engine being cranked by the starter) in a running mode when the engine is running normally or in a shutoff mode when the kill switch has been turned on or main switch has been turned off to initiate stopping of the engine.

Figure 13:
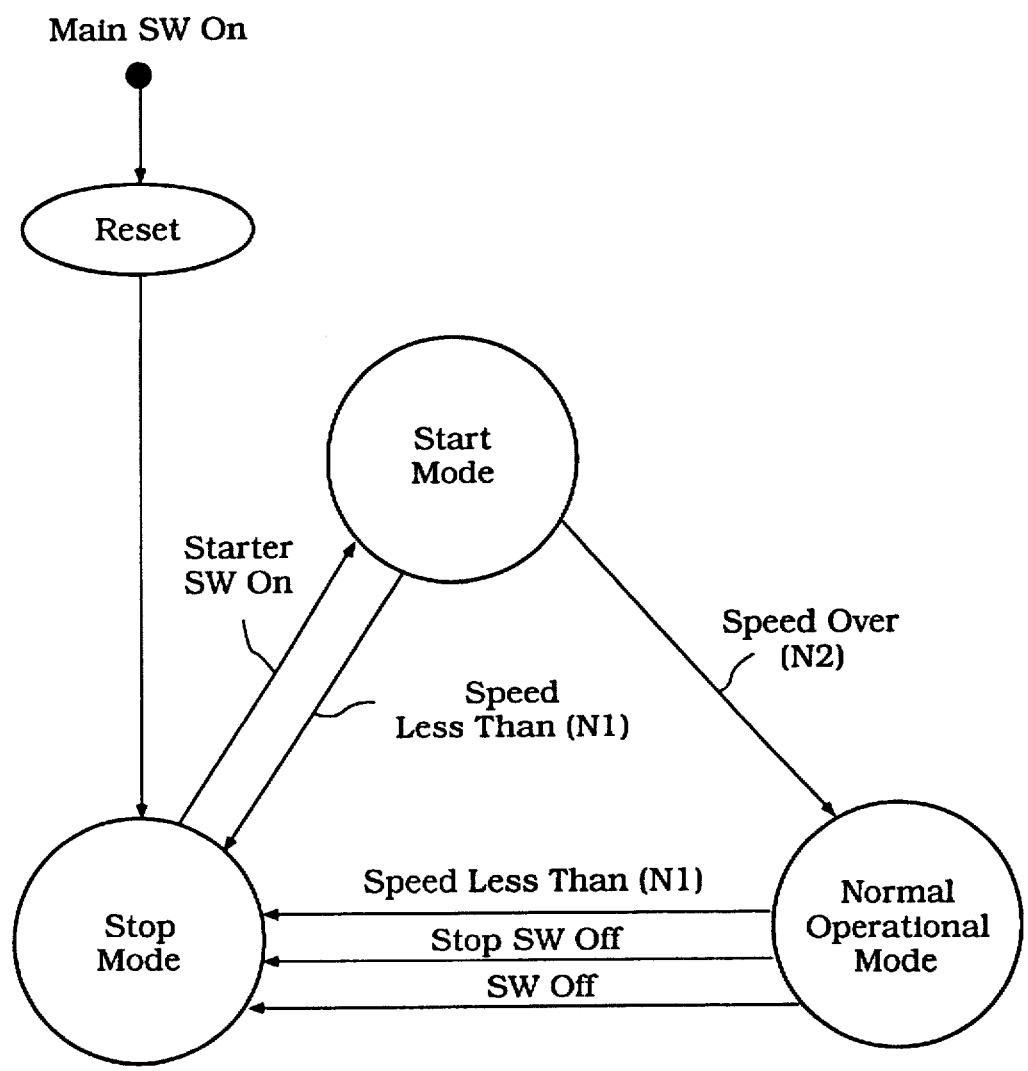

FIG. 13 shows schematically how this determination is made by the ECU. As may be seen when the main switch 104 is turned on the program moves to the reset mode and then moves to the portion of the control routine where either the stop mode, start mode, or normal operational modes are determined. This is done by determining the condition of the starter switch 102, the engine stop switch 103 and the main switch 104.

For example, if the starter switch is on and if the engine speed is less than a predetermined speed N1, this speed being a speed that is lower than an idle speed and actually lower than the speed when sustained engine running is possible, the program is in the start mode. If, however, this low-speed condition persists for more than a certain time, then the program moves to the stop mode.

If, however, the start mode is determined, then the program waits to see if the engine speed is above a predetermined speed N2 which is a speed that is in the range of but may be slightly lower than idle speed, then continued running is assured and the program moves to the operational mode condition. That is, it is determined that the engine is operating normally.

In the operational mode condition, this condition is maintained unless either the main switch 104 is turned off, the stop switch 103 is turned on, or the engine speed again falls below the predetermined low engine speed N1. If any of those situations occur, the program then goes into the stop mode operation.

Figure 14:
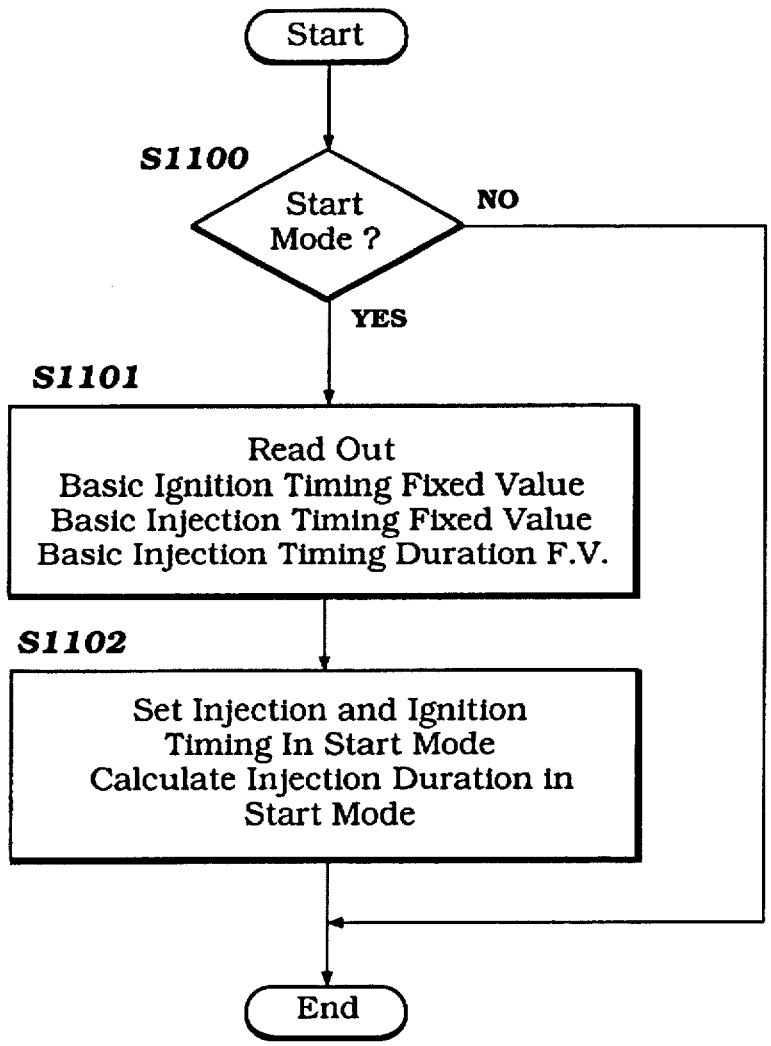
FIG. 14 is a block diagram showing the control routine to determine the ignition timing and the injection timing and amount during the start mode.

FIG. 14 shows the actual control routine when the engine is determined to be in the start mode under the conditions as described in conjunction with FIG. 13. The program moves to the step S1100 to confirm that the engine is in the start mode. If it is not, the program ends.

If, however, the engine is in the start mode, the program then moves to the step S1101 so as to read from a map the basic ignition timing fixed value, the basic injection period time fixed value, and the basic injection timing start fixed values. These values may be determined by any suitable manner but preferably they are chosen based upon the temperature of the engine as measured by the engine temperature switch 93.

The program then moves to the step S1101 so as to set the ignition timing and injection timing for the start mode and also so as to calculate the injection duration in the start mode. The program then ends.

Figure 15:
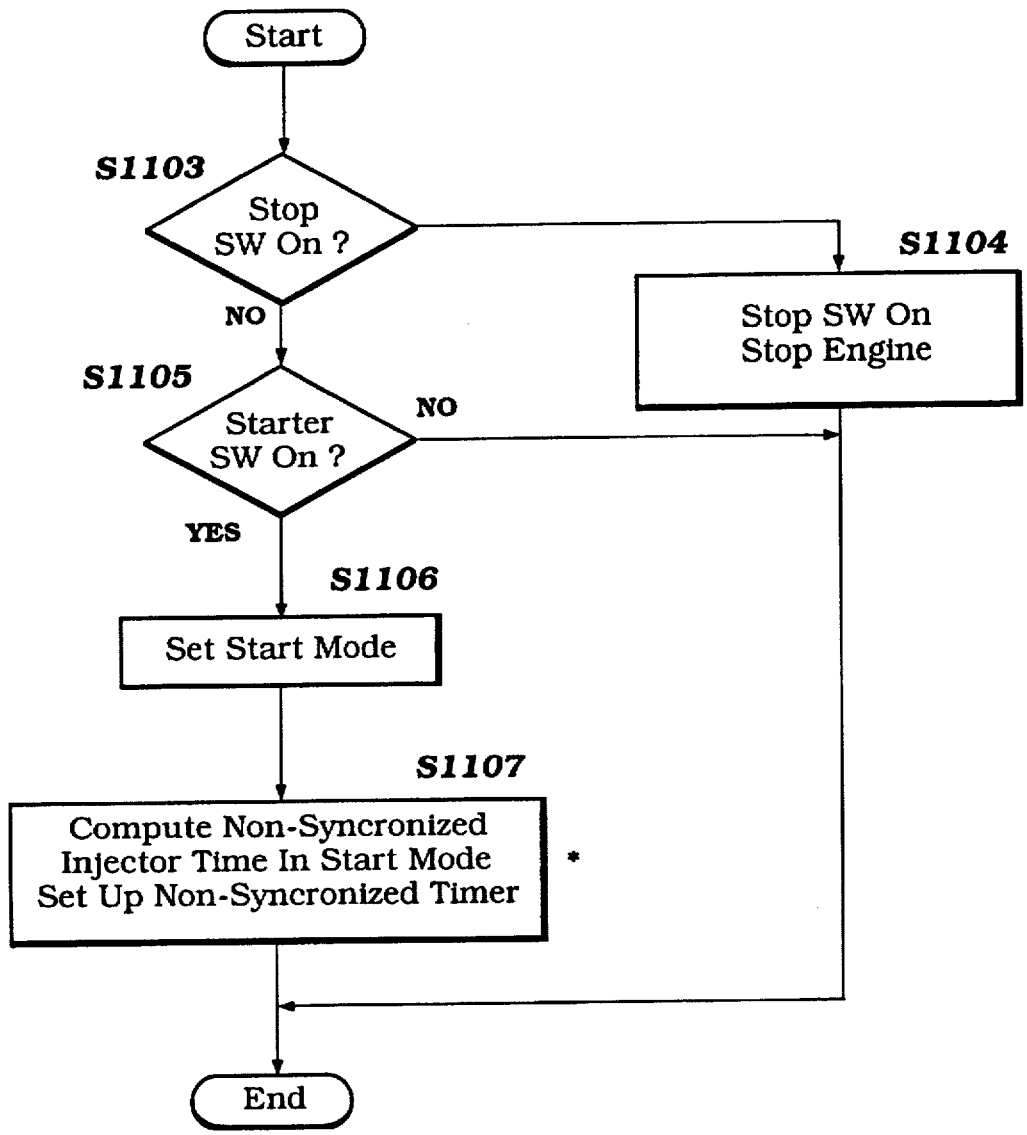
FIG. 15 is a block diagram showing the control routine so as to determine when the engine is operating in the start mode and how to fire the fuel injectors in this mode.

Having calculated this information the program follows a routine as shown in FIG. 15 wherein the ignition and injection timing are set. In order to understand this FIG., reference should also be made to FIG. 16. Dealing first with this later Figure, this shows the condition of the main switch 104, the starter switch 102, a start mode flag, the pulses outputted from the crank angle sensor 87 and the timer interruptions from timers 3 and 4 as aforenoted.

After the engine has started, the pulser signals from the pulser coil 87 or crank angle sensor are utilized so as to set both the ignition timing in the firing order and the injection timing also in the firing order. The injection timing initiation is set from a map dependent upon engine running conditions such as engine speed, load, and the other parameters which already have been noted. The timing interval is done by setting a timing for the amount of fuel Q0 which is to be injected by each injector. This is determined by taking a basic fuel injection amount Q1 which is determined from a map based upon engine speed and load, modifying it by multiplying it by a constant CO determined by various engine running conditions and ambient conditions and finally adding the amount Q2 which is the amount necessary to compensate for the delay in injection of actual fuel once the signal is sent to the solenoid. The constant CO is determined from the following equation:

$$CO = C1 \times C2 \times C3 \times C4$$

wherein C1 is an adjustment factor based on engine temperature, C2 is an adjustment factor based on atmospheric pressure, C3 is an adjustment factor based on intake air temperature and C4 is an adjustment factor based upon exhaust back pressure.

In order to initiate the starting cycle, the operator must first turn the main switch on, then turn the stop switch off and then turn the starter switch 102 on so as to begin cranking of the engine. Thus, as seen in FIG. 15, the program begins and then moves to the step S1103 to determine if the stop switch is on or off after the main switch has been turned on which initiates the start procedure. If the stop switch is on, the program then moves to the step S1104 so as to either process an engine stop and/or to provide a signal to the operator indicating that the stop switch is still on.

If at the step S1103 it has been determined that the stop switch is turned off, then the program moves to the step S1105 so as to determine if the starter switch 102 has been turned on. If it is not, the program repeats and ends.

If, however, at the step S1105, it is determined that the starter switch is turned on, then the program moves to the step S1106 so as to initiate the start mode operation. The program then moves to the step S1107 so as to determine that the engine is in the starting condition and set up so that the fuel injectors are all injected simultaneously as shown by the output pulses in FIG. 16. A number of pulses may be set and these are determined by the stamp mode and the number of pulses chosen is as predetermined depending on, for example, engine temperature. This will ensure that adequate fuel will reach whatever combustion chamber is going to be fired first.

Figure 16:
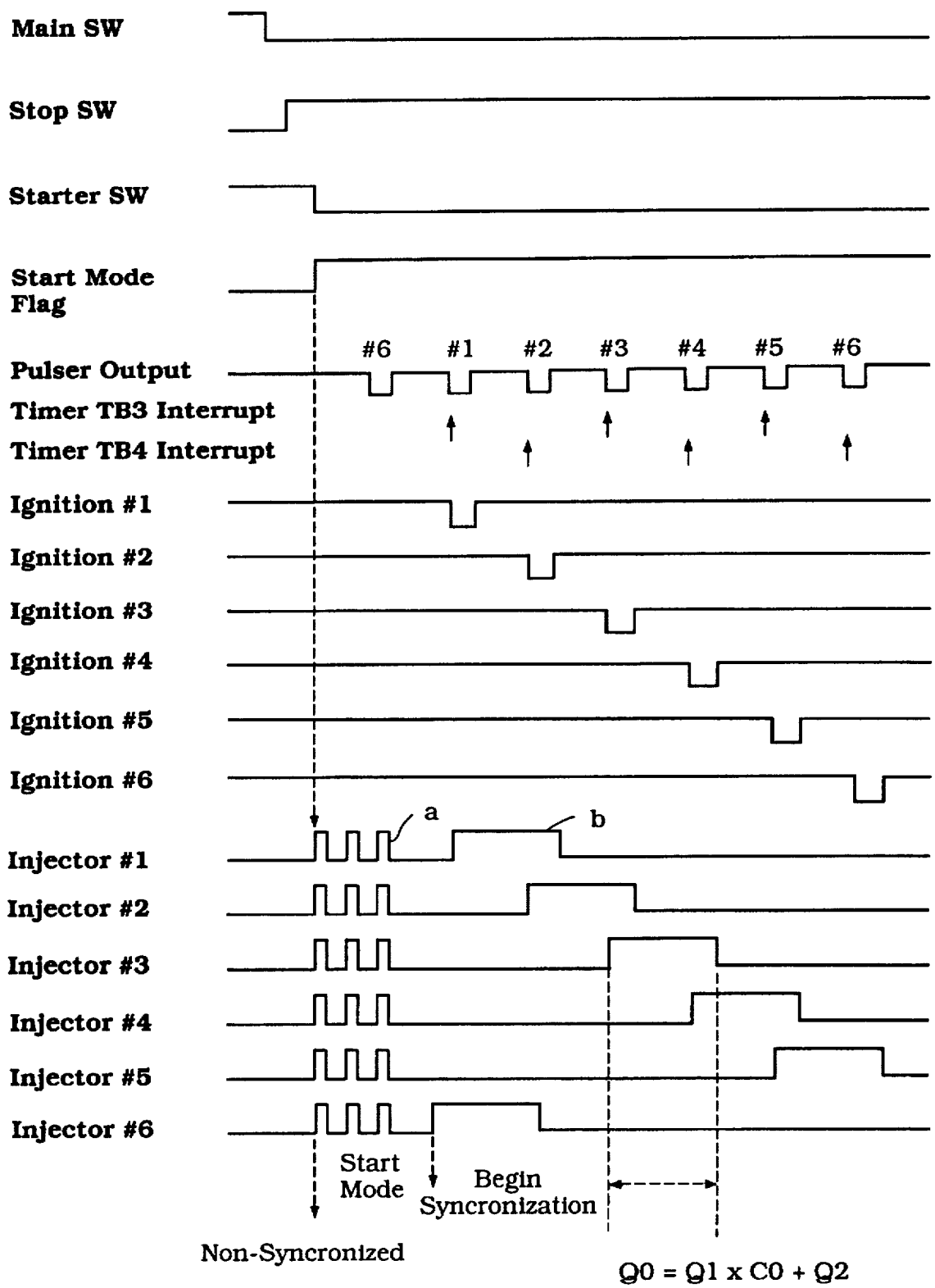
FIG. 16 is a graphical view showing the outputs of the main switch, the stop or kill switch, the starter switch, the condition of the start flag, the timer pulses from the crankshaft rotational sensor, the indication of when timers 3 and 4 are interrupted, the ignition output signals and the fuel injection output signals during a condition when the engine is first started up and then continues on into normal running.

The program then after a time period sets up the synchronized firing of the spark plugs which begins at the point a indicated in FIG. 16 as the start of synchronized injection. The first injector fired is the injector 6 and then the injector proceeds through the pulses b for firing the injectors in the normal engine firing order. Thus, as a result of this procedure, it will be ensured that starting can be accomplished quickly and that the engine will revert to synchronized fuel injection as soon as possible. This significantly improves engine startup performance without wasting fuel.

Thus, it should be apparent from the foregoing description that the described starting mode provides effective starting of the engine and achieves the goal set out. Of course, the foregoing description is that of a preferred embodiment of the invention and various changes and modifications may be made without departing from the spirit and scope of the invention, as defined by the appended claims.

I claim:

1. A two cycle, crankcase compression internal combustion engine comprised of a plurality of cylinders firing in a predetermined order, an air induction system for supplying an air charge to said cylinders through respective crankcase chambers each associated with a respective of said cylinders, a plurality of fuel injectors, at least one for each cylinder for injecting fuel into said air induction system upstream of the respective crankcase chamber for combustion in the respective of said cylinders, an exhaust system for discharging burnt combustion products from said cylinders, means for starting said engine, and a fuel injection control for injecting fuel from said fuel injectors in a timed sequence during normal running of the engine and for injecting fuel simultaneously from a plurality of said fuel injectors upon initiation of the operation of the means for starting the engine.

2. A two-cycle crankcase compression internal combustion engine as set forth in claim 1, wherein fuel is injected from all of the fuel injectors simultaneously in response to the means for starting the engine.

3. A two-cycle crankcase compression internal combustion engine as set forth in claim 1, further including means for determining a fuel injection amount during normal running conditions based upon engine running conditions.

4. A two-cycle crankcase compression internal combustion engine as set forth in claim 3, further including means for setting a predetermined amount of fuel injection upon starting operation.

5. A two-cycle crankcase compression internal combustion engine as set forth in claim 4, wherein the starting fuel injection amount is determined by the engine temperature.

6. A two-cycle crankcase compression internal combustion engine as set forth in claim 4, wherein the amount of fuel injected during normal running is varied in response to certain sensed engine operating conditions.

7. An internal combustion engine comprised of a plurality of cylinders firing in a predetermined order, an air induction system for supplying an air charge to said cylinders, a plurality of fuel injectors, at least one for each cylinder for injecting fuel for combustion in the respective of said cylinders, an exhaust system for discharging burnt combustion products from said cylinders, means for starting said engine, and a fuel injection control for injecting fuel from said fuel injectors in a timed sequence during normal running of the engine and for injecting fuel simultaneously from a plurality of said fuel injectors upon initiation of the operation of the means for starting the engine, the amount of fuel injected during normal running being varied in response to certain sensed engine operating conditions based upon the following formula:

$$Q0 = Q1 \times CO + Q2$$

wherein Q1 is the basic injection amount determined at starting time, CO is an adjustment factor depending upon engine operational state, and Q2 is an amount of injection compensating to the delay in initiation of fuel injection upon the initiation of the fuel injection signal.

8. An internal combustion engine as set forth in claim 7, wherein:

$$CO = C1 \times C2 \times C3 \times C4$$

wherein C1 is an adjustment factor based on engine temperature, C2 is an adjustment factor based on atmospheric pressure, C3 is an adjustment factor based on intake air temperature and C4 is an adjustment factor based upon exhaust back pressure.

9. An internal combustion engine as set forth in claim 8, wherein the engine is a power plant for an outboard motor that is mounted for trim adjustment on a watercraft and wherein back pressure is calculated by trim adjustment condition.

10. A method of operating a two cycle, crankcase compression, internal combustion engine comprised of a plurality of cylinders firing in a predetermined order, an air induction system for supplying an air charge to said cylinders through respective crankcase chambers each associated with a respective of said cylinders, a plurality of fuel injectors, at least one for each cylinder for injecting fuel for combustion in the respective of said cylinders into said air induction system upstream of said crankcase chambers, an exhaust system for discharging burnt combustion products from said cylinders, means for starting said engine, said method comprising the steps of controlling the injection of fuel from said fuel injectors in a timed sequence during normal running of the engine and injecting fuel simultaneously from a plurality of said fuel injectors upon initiation of the operation of the means for starting the engine.

11. A method of operating an internal combustion engine as set forth in claim 10, wherein fuel is injected from all of the fuel injectors simultaneously in response to the means for starting the engine.

12. A method of operating an internal combustion engine as set forth in claim 10, further including the step of determining a fuel injection amount during normal running conditions based upon engine running conditions.

13. A method of operating an internal combustion engine as set forth in claim 12, further including the step of initially setting a predetermined amount of fuel injection upon starting operation.

14. A method of operating an internal combustion engine as set forth in claim 13, wherein the starting fuel injection amount is determined by the engine temperature.

15. A method of operating an internal combustion engine as set forth in claim 13, wherein the amount of fuel injected during normal running is varied in response to certain sensed engine operating conditions.

16. A method of operating an internal combustion engine comprised of a plurality of cylinders firing in a predetermined order, an air induction system for supplying an air charge to said cylinders, a plurality of fuel injectors, at least one for each cylinder for injecting fuel for combustion in the respective of said cylinders, an exhaust system for discharging burnt combustion products from said cylinders, means for starting said engine, said method comprising the steps of controlling the injection of fuel from said fuel injectors in a timed sequence during normal running of the engine and injecting fuel simultaneously from a plurality of said fuel injectors upon initiation of the operation of the means for starting the engine, the amount of fuel injected during normal running being varied in response to certain sensed engine operating conditions, and, the amount of fuel supplied during engine running conditions being based upon the following formula:

$$Q0 = Q1 \times C0 + Q2$$

wherein Q1 is the basic injection amount determined at starting time, C0 is an adjustment factor depending upon engine operational state, and Q2 is an amount of injection compensating to the delay in initiation of fuel injection upon the initiation of the fuel injection signal.

17. A method of operating an internal combustion engine as set forth in claim 16, wherein $$C0 = C1 \times C2 \times C3 \times C4$$

wherein C1 is an adjustment factor based on engine temperature, C2 is an adjustment factor based on atmospheric pressure, C3 is an adjustment factor based on intake air temperature and C4 is an adjustment factor based upon exhaust back pressure.

18. A method of operating an internal combustion engine as set forth in claim 17, wherein the engine is a power plant for an outboard motor that is mounted for trim adjustment on a watercraft and wherein back pressure is calculated by trim adjustment condition.

* * * * *

UNITED STATES PATENT AND TRADEMARK OFFICE
CERTIFICATE OF CORRECTION

PATENT NO.  : 5,713,334
DATED       : February 3, 1998
INVENTOR(S) : Anamoto

It is certified that error appears in the above-identified patent and that said Letters Patent is hereby corrected as shown below:

Column 19,
Lines 27, 31, 35, 39 and 42, please change "operating an internal" to -- operating a two cycle, crank case compression, internal --.

Signed and Sealed this

Fifth Day of November, 2002

Attest:

Attesting Officer

JAMES E. ROGAN
Director of the United States Patent and Trademark Office